(No Model.)　　　　　　　　　　　　　　　　　　　2 Sheets—Sheet 1.
S. A. MENZEMER.
DRIER.

No. 480,112.　　　　　　　　　　　Patented Aug. 2, 1892.

Witnesses:
J. H. Muse
J. A. Bayless

Inventor,
Stephen A. Menzemer
By Dewey & Co.
Attys (No Model.)
2 Sheets—Sheet 2.

S. A. MENZEMER.
DRIER.

No. 480,112.
Patented Aug. 2, 1892.

Witnesses,
J. A. Bayless

Inventor,
Stephen A. Menzemer
By Dewey & Co.
Attys.

UNITED STATES PATENT OFFICE.

STEPHEN AUGUSTUS MENZEMER, OF SANTA CLARA, CALIFORNIA.

DRIER.

SPECIFICATION forming part of Letters Patent No. 480,112, dated August 2, 1892.

Application filed October 2, 1891. Serial No. 407,562. (No model.)

*To all whom it may concern:*

Be it known that I, STEPHEN AUGUSTUS MENZEMER, a citizen of the United States, residing at Santa Clara, Santa Clara county, State of California, have invented an Improvement in Driers; and I hereby declare the following to be a full, clear, and exact description of the same.

My invention relates to the class of driers for fruit and other articles; and it consists in the novel arrangement and combination of parts hereinafter fully described, and specifically pointed out in the claim, and the object of which is to better distribute and equalize the heated air throughout the entire contents of the apparatus.

Figure 1:
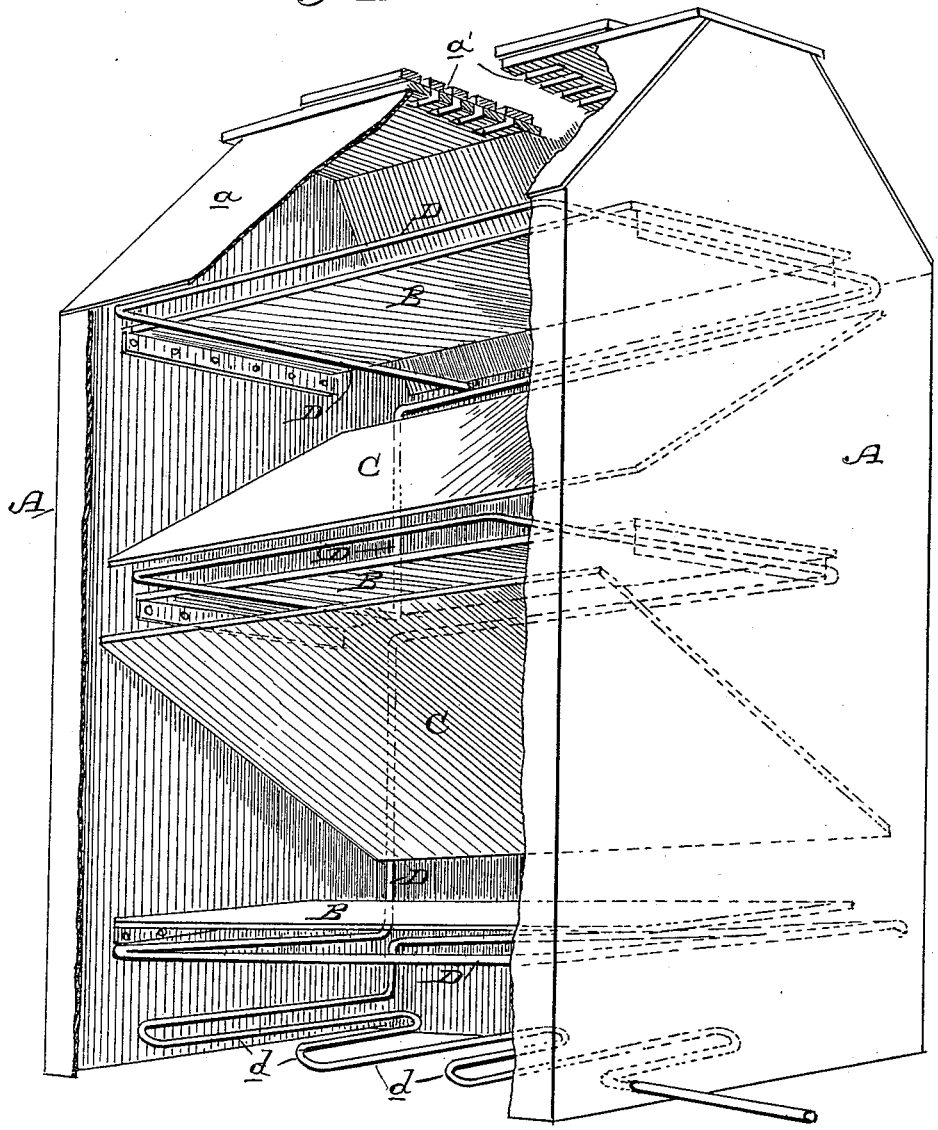
Figure 2:
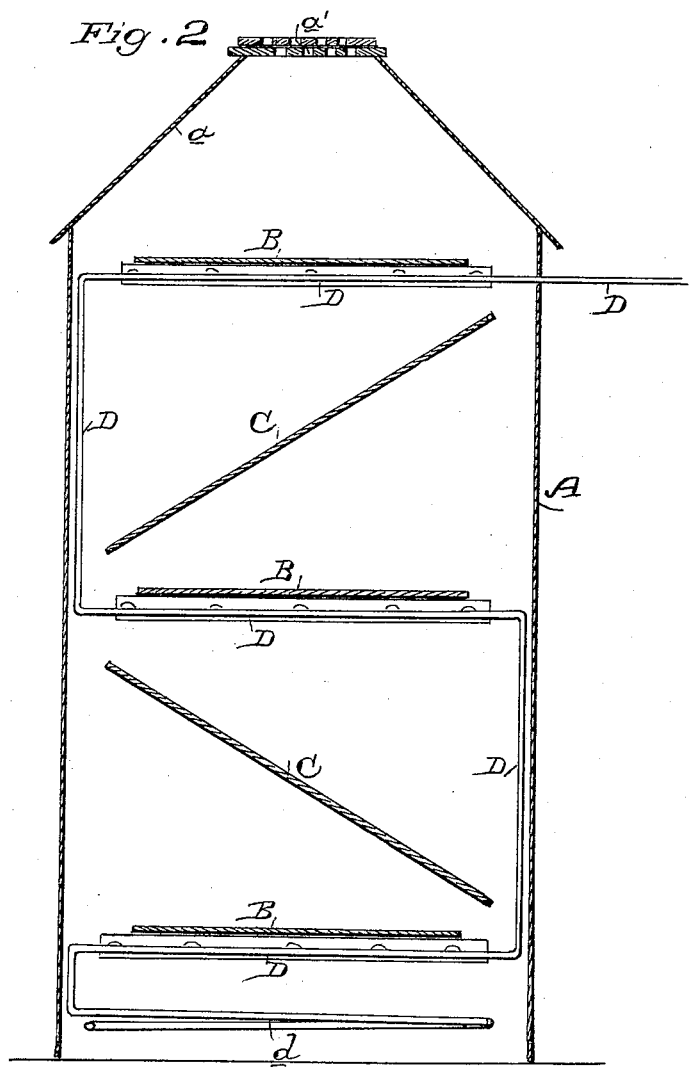

Referring to the accompanying drawings for a more complete explanation of my invention, Figure 1 is a perspective view of my drier, the front wall being broken away to show the interior. Fig. 2 is a vertical section of same.

A is the inclosing casing of the drier, having a roof $a$ and a regulating air-outlet $a'$. This casing is preferably made of galvanized iron. Within the casing are supported in vertical series the horizontal trays B, which carry the fruit or other article to be dried. These trays are separated, and between them are located the inclined deflecting-plates C, which may be made of suitable material, such as galvanized sheet metal. Adjacent or successive plates are oppositely inclined, as shown, and their ends project beyond the ends of the trays. Access is had to the trays by a suitable door opening and closing directly on them.

D is a steam-pipe, which enters the casing above and thence passes under the top tray, thence downwardly and back under the next tray, and so on to the bottom, where it forms the coil $d$ and then issues from the casing. I prefer that in passing back and forth under the trays it shall encircle the walls of the casing horizontally under one tray, then pass vertically downward and encircle the walls under the next tray, and so on until it reaches the bottom of the casing, where it shall form the coil $d$ and emerge from the side of the casing, as shown.

In operation the deflecting-plates C serve a double purpose—first, of directing the heated air upwardly first to one side and then to the other, so that it is equally distributed and the fruit will be equally dried, and, second, they serve to catch the drip from the superposed trays and to direct it to the sides of the casing. The course of the steam-pipe D is also advantageous in effecting an equal distribution of air.

Having thus described my invention, what I claim as new, and desire to secure by Letters Patent, is—

A drier consisting of the casing having an air-regulator at its top, the horizontal separated trays supported at different heights within said casing, a deflector-plate located between adjacent trays, adjacent plates being oppositely inclined and having their edges extending beyond vertical planes of the edges of the trays and terminating short of the walls of the casing, the steam-pipe entering the upper portion of the casing under the uppermost tray and extending around under each tray, and a coil formed in said pipe in the bottom of the casing, substantially as herein described.

In witness whereof I have hereunto set my hand.

STEPHEN AUGUSTUS MENZEMER.

Witnesses:
W. D. WATSON,
A. A. SMITHSON.